April 17, 1951  W. H. RATHERT ET AL  2,549,236
LOG BUCKING CHAIN SAW
Filed Dec. 4, 1945  2 Sheets-Sheet 1
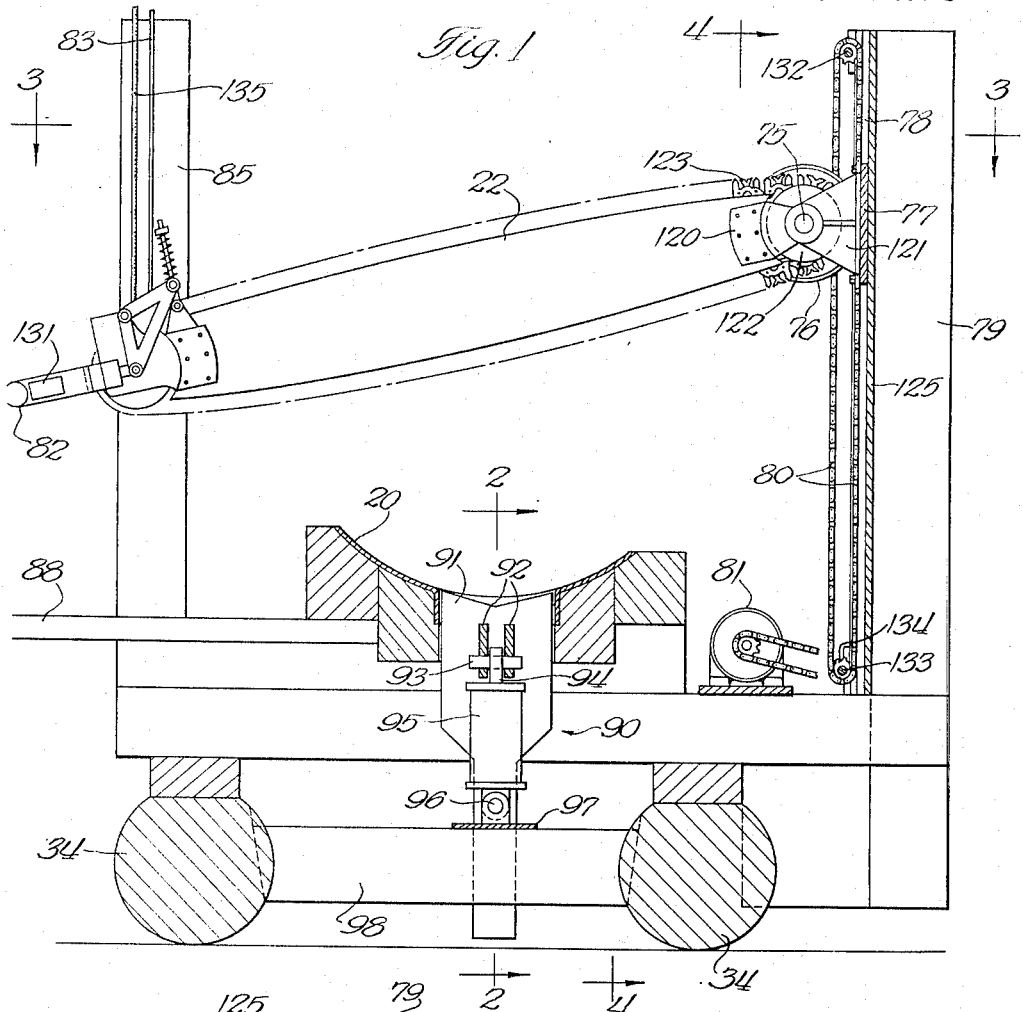
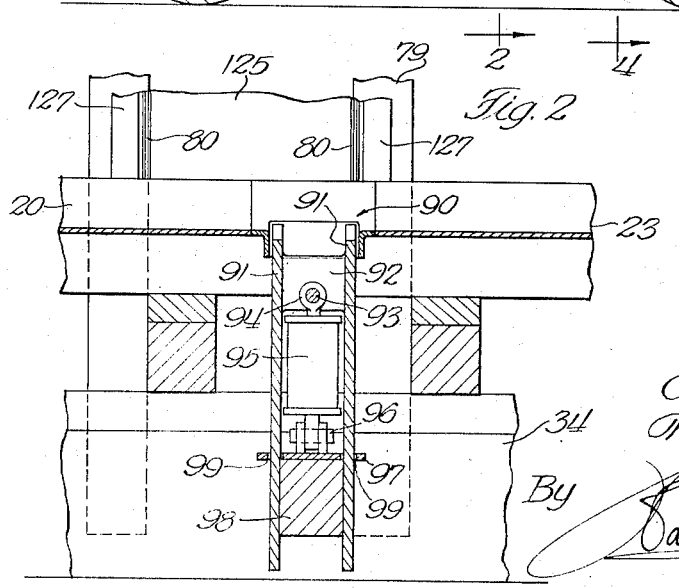
INVENTORS
Charles A. Wilson
Walter H. Rathert
By Harold D. Cook
Attorney April 17, 1951 W. H. RATHERT ET AL 2,549,236
LOG BUCKING CHAIN SAW
Filed Dec. 4, 1945 2 Sheets-Sheet 2
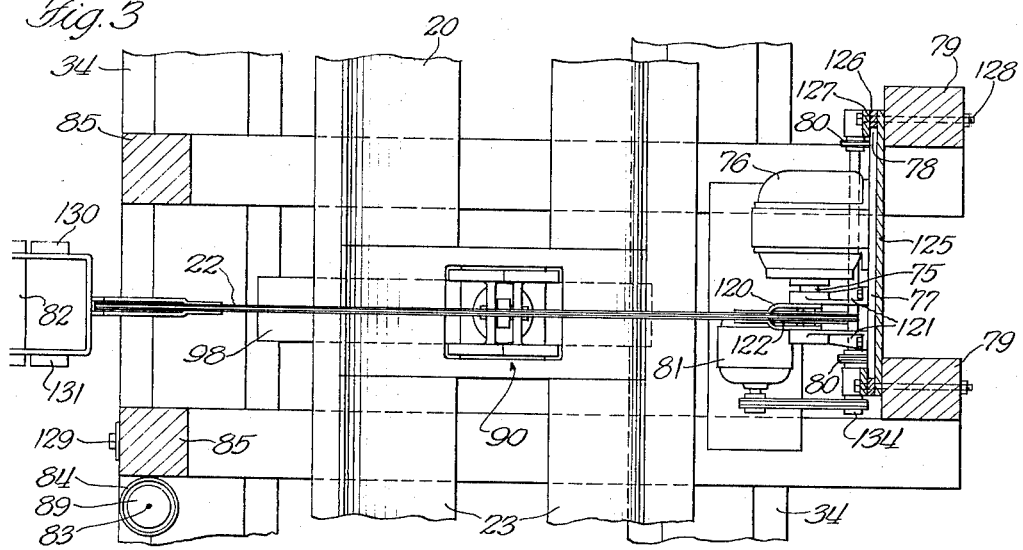
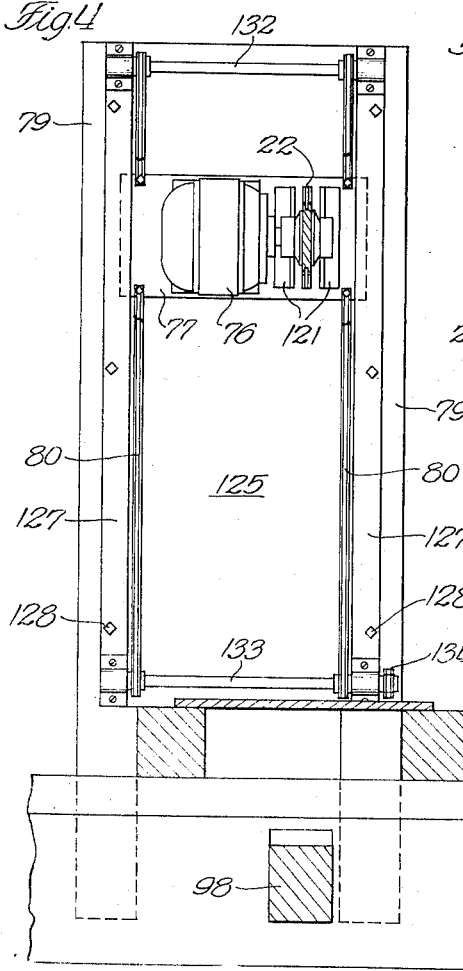
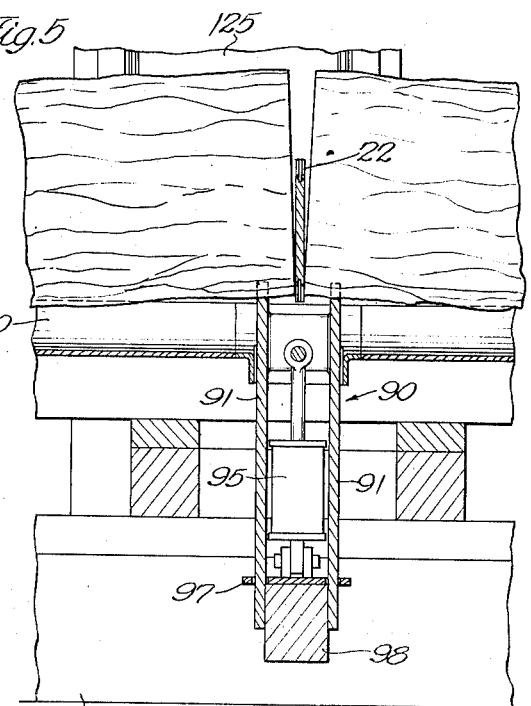
INVENTORS
Charles A. Wilson
Walter H. Rathert
By
Harold D. Cook
ATTORNEY Patented Apr. 17, 1951

2,549,236

UNITED STATES PATENT OFFICE 2,549,236

LOG BUCKING CHAIN SAW

Walter H. Rathert, Klickitat, and Charles A. Wilson, Glenwood, Wash., assignors to J. Neils Lumber Company, Portland, Oreg., a corporation of Minnesota Application December 4, 1945, Serial No. 632,625

2 Claims. (Cl. 143—32)

This invention relates to a novel power operated cross cut saw, and has particular reference to a chain saw mounted for use in a novel log bucking chute as disclosed in a copending application for Log Bucking Chute, Serial No. 632,624, filed December 4, 1945 by Walter H. Rathert, Leon Wilson, Howard L. Murray, Charles A. Wilson, and Donald W. Martin.

The copending application discloses a log bucking chute provided with power operated mechanisms for handling tree length logs and sawing such logs into merchantable lengths for shipment to a sawmill. A first conveyor is provided in a delivery chute for moving the tree length logs endwise into position under a bucking saw for accurately cutting marked lengths, and a second conveyor is provided in a reclining chute on the opposite side of the saw with respect to the first conveyor for removing the sawed logs.

The present invention relates to the sawing mechanism used in the above described bucking chute and comprises a novel power operated movable mounting for a chain saw whereby the bucking operation is accomplished quickly and easily on tree length logs fed to the saw one after the other.

The object of the invention, in general, is to provide an improved power sawing mechanism for use in a log bucking chute of the type described.

A further object is to provide a novel mounting for a chain saw whereby the saw can be rocked in the cut in a log of large diameter to facilitate the cutting action.

A further object is to provide a power operated chain saw having one end pivotally mounted on a vertical slide which may be raised or lowered by power means under push button control, and having the other end freely suspended from a counterweight so that both ends of a long heavy saw capable of sawing through large logs can easily be manipulated by one operator.

Another object is to provide a power operated jack for raising the portion of the log beneath the saw to prevent pinching of the saw.

These and other objects are attained through the construction and arrangement of parts shown in the accompanying drawings illustrating a preferred embodiment of the invention. This particular embodiment is shown by way of illustration only and not for the purpose of limiting the invention, since the objects and advantages may be accomplished by a variety of modifications as will occur to persons skilled in the art.

In the drawings:

Figure 1 is a cross sectional view through a log bucking chute showing a chain saw mounted in accordance with the present invention for sawing logs in the chute;

Figure 2 is a sectional view taken on the line 2—2 of Figure 1;

Figure 3 is a sectional view taken on the line 3—3 of Figure 1;

Figure 4 is a sectional view taken on the line 4—4 of Figure 1; and

Figure 5 is a view corresponding to Figure 2, showing the jack in raised position to spread the saw cut to avoid pinching the saw.

Using where applicable the reference numerals employed in the copending application, the numeral 20 designates the end of a shallow receiving chute having a conveyor in its bottom for moving logs lengthwise into cutting position under the chain saw designated generally by the numeral 22. The mechanical apparatus disclosed herein is mounted in one section of an elongated log bucking chute comprising a plurality of sections to accommodate tree length logs which may be one hundred feet or more in length. The various sections of the log bucking chute are mounted on skids 34 for portability, so that they may be moved individually from one location to another as logging operations progress through the forest. Interconnecting the skids 34 at spaced intervals are transverse members such as the member 98 which is here used as a support for a hydraulic jack. On opposite sides of the chute or trough 20 are a pair of upright posts 79 on the rear side, and a pair of similar posts 85 on the front side, the so-called front and rear sides being designated with respect to the operator's platform 88. In general, the supporting blade of the saw 22 is mounted for pivotal movement concentric with a drive shaft 75 on a motor 76. The saw and motor are mounted upon a slider plate 77 which serves as a saw carriage for movement in a vertical track 78 mounted on the posts 79, the slider plate being raised and lowered by an endless chain 80 which may be driven in either direction by an electric lift motor 81. The free end of the saw is provided with a handle 82, and its weight is supported by a cable 83 connected with a counterweight 89 contained within a tubular guard or housing 84 alongside one of the posts 85.

Referring now particularly to details of the saw mounting shown in Figure 3, the blade 22 is seen to be secured to a fork or yoke 120 pivotally mounted in the spaced arms of a bearing bracket 121 attached to the slider plate 77. Mounted on the motor shaft 75 between the arms of the yoke 120 is a driving sprocket 122 for the chain 123 which carries the cutting teeth of the saw.

The vertical track, previously referred to generally by the numeral 78, comprises a solid back plate 125 spanning the posts 79, a spacer strip 126, and a flange plate 127 overlying the slider plate 77 on each side thereof, these members being clamped together and to the respective posts 79 by means of bolts 128. The slider plate is thereby guided for easy sliding movement in the track 78, and is at the same time solidly backed up against the thrust of the saw by the back plate 125. The saw motor 76 is controlled by a switch 130 mounted on one side of the handle, and the lift motor 81 is controlled by a raising and lowering switch 131 mounted on the other side of the handle. If preferred, however, the switches 130 and 131 may be mounted on the post 85. The chains 80 are connected with the slider plate in the manner shown in Figure 4, and are trained over sprockets mounted on parallel shafts 132 and 133, the former being an idler shaft and the latter being a driving shaft having a sprocket 134 driven by the motor 81.

Beneath the saw is disposed a jack 90 for lifting a log in the manner shown in Figure 5 to open up the saw cut to prevent binding. The log engaging elements of the jack comprise a pair of spaced jaw plates 91 which are retractible through a bottom opening in the trough 20 directly beneath the saw to avoid interference with the movement of logs in the trough. Interconnecting the jaw plates 91 are a pair of bridge members 92 carrying a pin 93 affording pivotal connection with a piston rod 94 in a hydraulic cylinder 95. The interconnecting members 92 are spaced below the log supporting ends of the jaw plates 91 sufficiently to allow the saw to easily complete its cut through the log as shown in Figure 5, and suitable stop means may be provided, if desired, to prevent the saw from cutting into the members 92. The lower end of the hydraulic cylinder 95 is mounted on a pin 96 for support on a plate 97 on the cross member 98. Overhanging sides are provided on the plate 97 having openings 99 therein for guiding the vertical movement of the lower ends of the jaw plates 91 on opposite sides of the cross member 98.

Thus, when hydraulic pressure is established in the cylinder 95 by an electric pump or other suitable means under control of a push button switch such as the switch 129 on post 85, a log in the trough 20 is raised beneath the saw in the manner shown in Figure 5. The logs ordinarily handled in the bucking chute are of such a size and weight as to bend readily when jacked up a few inches in this manner so as to cause separation of the cut ends for spreading the cut as the saw progresses down through the log. The action of the jack in this manner greatly facilitates the work of the saw, so that with the use of the present equipment in the manner described huge logs can be sawed through in a few seconds' time without the use of a large motor to drive the saw.

The switch indicated at 131 may comprise a single tiltable lever, or a plurality of buttons, to start the lift motor 81 in either direction and to stop the motor. The electrical conductors for the switches 130 and 131 may conveniently be embodied in a flexible cable 135 extending upwardly alongside the counterweight cable 83 to a junction box at the top of one of the posts 85. By manipulating the convenient switch 131, the operator can raise and lower the rear end of the saw at will in conjunction with his raising and lowering of the handle end to rock the saw in the cut to obtain the most rapid and efficient cutting action with this type of saw.

In the construction of the bucking chute as described in the copending application the receiving trough 20 extends through beneath the saw and becomes a delivery trough 23 for removing sawed logs and disposing them in a pile available to a logging railroad or other means of transportation. Separate conveyors are provided in the troughs 20 and 23 for moving logs into position for sawing and for removing sawed logs, but the details of this equipment are not included in the present invention.

Although the sawing mechanism herein shown and described is related specifically to a log bucking chute, it is to be understood that the saw may be used to advantage with other forms of handling equipment, and also on materials other than heavy timbers, and the invention is deemed to include all such uses and applications as are included in the scope of the appended claims.

Having now described our invention and in what manner the same may be used, what we claim as new and desire to protect by Letters Patent is:

1. In a log bucking chute, a log holding trough, a vertical track at one side of said trough, a saw carriage mounted for vertical travel on said track, power operated lift means for raising and lowering said saw carriage, a chain saw extending across said trough and mounted at one end on a horizontal pivot on said carriage, power operated means on said carriage for driving said saw, said saw having a free end on the opposite side of said trough from said vertical track, a handle on said free end for swinging said saw in a vertical sawing plane on said horizontal pivot, a first control means on said handle to start and stop said saw, and a second control means on said handle to start, stop and reverse said lift means for rocking the saw in a cut during a sawing operation by manipulation of said handle and second control means.

2. In a log bucking chute, a log holding trough, a vertical track at one side of said trough, a saw carriage mounted for vertical travel on said track, lift means extending along said track and connected with said carriage, a reversible electric lift motor at the base of said vertical track having driving connection with said lift means to raise and lower said carriage, a chain saw extending across said trough, said saw having one end mounted on a horizontal pivot on said carriage and having a free end equipped with a handle on the opposite side of said trough from said vertical track for swinging the saw in a vertical sawing plane on said horizontal pivot, an electric motor on said carriage for driving said saw, switch means on said handle to start and stop said saw driving motor, and switch means on said handle to start, stop and reverse said lift motor for rocking the saw in a cut during a sawing operation by manipulation of said handle and last mentioned switch means.

WALTER H. RATHERT.
CHARLES A. WILSON.

(References on following page)

REFERENCES CITED

The following references are of record in the file of this patent:

UNITED STATES PATENTS

| Number | Name | Date |
|---|---|---|
| 764,717 | Foshee | July 12, 1904 |
| 824,009 | Gray | June 19, 1906 |
| 932,217 | Wilkinson | Aug. 24, 1909 |
| 973,258 | Cannon | Oct. 18, 1910 |
| 1,001,272 | Howard | Aug. 22, 1911 |
| 1,043,433 | Jackson | Nov. 5, 1912 |
| 1,835,376 | Cherney | Dec. 8, 1931 |
| 2,094,124 | Huffman | Sept. 28, 1937 |
| 2,296,240 | Blum | Sept. 22, 1942 |
| 2,326,854 | Hassler | Aug. 17, 1943 |
| 2,410,887 | Locke | Nov. 12, 1946 |